(12) United States Patent
Hasegawa (10) Patent No.: US 7,982,348 B2
(45) Date of Patent: Jul. 19, 2011

(54) ELECTRIC WIRE HOLDING STRUCTURE FOR ELECTRIC COMPRESSOR AND ELECTRIC WIRE HOLDING METHOD FOR ELECTRIC COMPRESSOR

(75) Inventor: Takehiro Hasegawa, Isesaki (JP)

(73) Assignee: Sandan Corporation, Isesaki-shi, Gunma (JP)

( * ) Notice: Subject to any disclaimer, the term of this patent is extended or adjusted under 35 U.S.C. 154(b) by 76 days.

(21) Appl. No.: 12/373,397

(22) PCT Filed: Jun. 20, 2007

(86) PCT No.: PCT/JP2007/062383
§ 371 (c)(1),
(2), (4) Date: Jan. 12, 2009

(87) PCT Pub. No.: WO2008/007523
PCT Pub. Date: Jan. 17, 2008

(65) Prior Publication Data
US 2009/0315418 A1 Dec. 24, 2009

(30) Foreign Application Priority Data
Jul. 13, 2006 (JP) ................................. 2006-192888

(51) Int. Cl.
*H02K 11/00* (2006.01)
(52) U.S. Cl. ........................................................ 310/71
(58) Field of Classification Search .................... 310/71; H02K 3/46; H01F 5/04
See application file for complete search history.

(56) References Cited

U.S. PATENT DOCUMENTS

| 7,083,399 B2 * | 8/2006 | Kurihara et al. ............ 417/423.7 |
| 2005/0231050 A1 * | 10/2005 | Sasaki et al. .................... 310/71 |
| 2009/0097993 A1 * | 4/2009 | Ryu et al. .................... 417/410.1 |

FOREIGN PATENT DOCUMENTS
JP 2008-148423 * 6/2008
* cited by examiner

*Primary Examiner* — Nguyen N Hanh
(74) *Attorney, Agent, or Firm* — Baker Botts L.L.P.

(57) ABSTRACT

A structure and method for holding an electric wire connected to the inside of an electric compressor incorporating a motor. The structure has a holding member for holding an electric wire present between a connection terminal section for connection to the outside and a built-in electric device. The structure and method can reliably eliminate possibility of adverse affection to an input electric wire caused by vibration, etc. while preventing a reduction in efficiency of assembly work and an increase in size of the compressor.

7 Claims, 6 Drawing Sheets

FIG. 6
PRIOR ART

ELECTRIC WIRE HOLDING STRUCTURE FOR ELECTRIC COMPRESSOR AND ELECTRIC WIRE HOLDING METHOD FOR ELECTRIC COMPRESSOR

CROSS-REFERENCE TO RELATED APPLICATIONS

This application is the National Stage of International Patent Application No. PCT/JP2007/062383, filed Jun. 20, 2007, which claims the benefit of Japanese Patent Application No. 2006-192888, filed Jul. 13, 2006, the disclosures of which are incorporated herein by reference in their entirety.

TECHNICAL FIELD OF THE INVENTION

The present invention relates to an electric wire holding structure for an electric compressor and an electric wire holding method for an electric compressor for holding and fixing an electric wire connected to an inside of an electric compressor incorporating a motor, for example, an electric wire connected to a built-in electric device such as a stator of the incorporated motor.

BACKGROUND ART OF THE INVENTION

Figure 5:
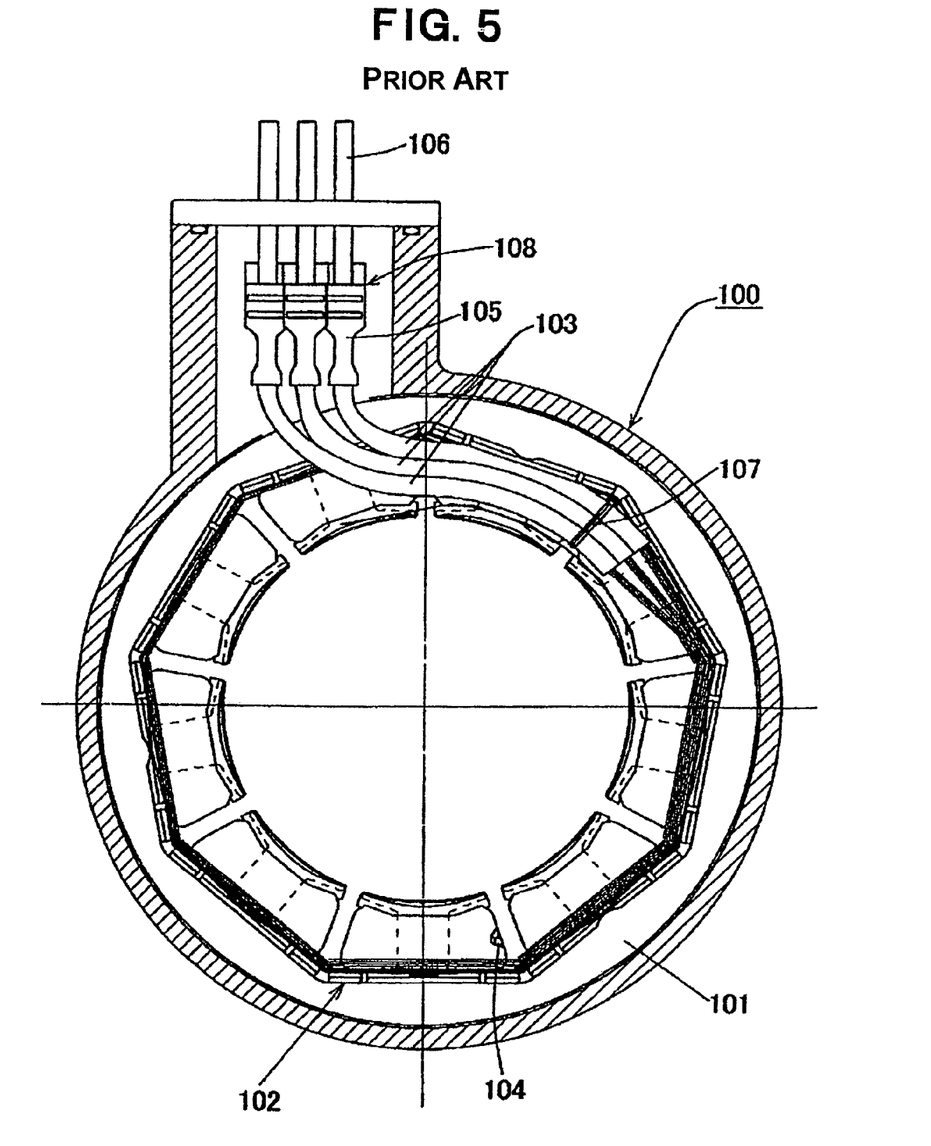
FIG. 5 is a cross-sectional view of an electric compressor in which an input electric wire of an incorporated motor is held using a conventional electric wire holding structure.
Figure 6:
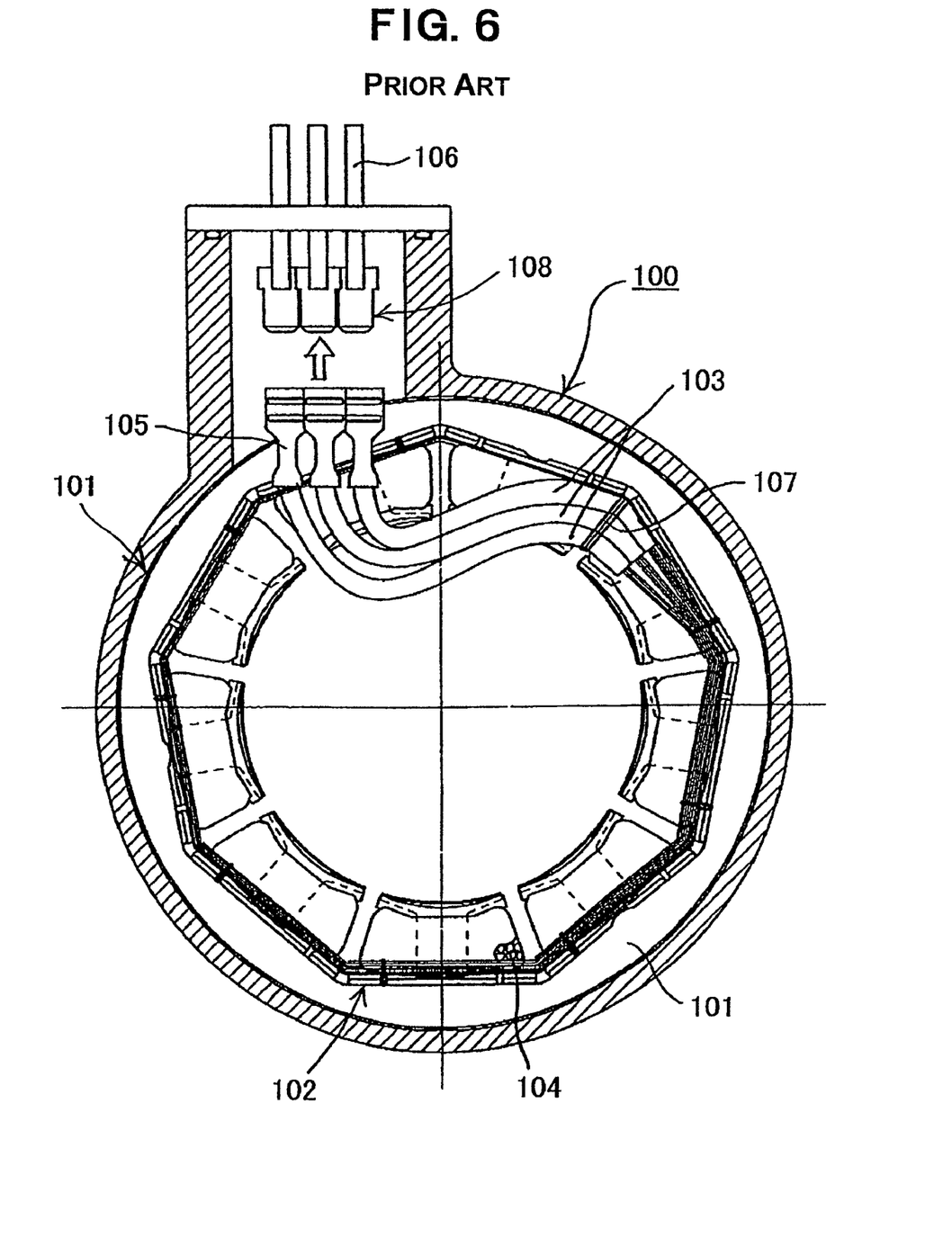
FIG. 6 is a cross-sectional view of the electric compressor depicted in FIG. 5, showing a state of an input electric wire of an incorporated motor when the wire is connected to an external terminal for power supply.

A stator of an electric motor incorporated into a conventional compressor, for example, as depicted in FIG. 5, is fixed in stator housing 100 having external terminals for power supply 106 on its side, and terminals 105 of electric wires 103 for input to the stator side are connected to the external terminals for power supply 106. In FIG. 5, a bobbin 102 is provided in stator 101 stored in stator housing 100, and extended wires of input electric wires 103 to the stator side are wound onto bobbin 102 to form a coil section 104. Terminals 105 of input electric wires 103 are connected to external terminals for power supply 106 to form a connection terminal section 108 for connection to the outside. Input electric wires 103 are bundled by a bundling member 107 at a position of stator side. On the other hand, because terminals 105 of input electric wires 103 are connected to external terminals for power supply 106, the input electric wires 103 are fixed at two positions of the terminal side and the stator side. Because the portion therebetween is free, however, in a case where a vibration is applied to the compressor, input electric wires 103 may interfere with the inside portion of the stator housing or other devices, and the input electric wires 103 or the other devices may be adversely affected unexpectedly. In particular, as shown in FIG. 6, because input electric wires 103 are fixed at the position of bundling member 107 beforehand when terminals 105 of input electric wires 103 are connected, the length of wires from the fixing portion to the portion of terminals 105 are frequently set to be slightly longer for the connection work. If the wire length is set longer, the above-described interference may occur more easily. In order to prevent such an inconvenience, for example, considered is a structure wherein the length of input electric wires 103 from connection terminal section 108 to the bundled portion by bundling member 107 is set as short as possible for preventing the interference with other devices when input electric wires 103 move by a vibration, or a structure wherein an enough gap is ensured between input electric wires 103 and other devices for preventing the interference.

If the length of input electric wires 103 is set short, the connection work of the electric wires 103, ultimately, the assembly work of stator 101, may be remarkably damaged. Further, when an enough gap is provided between input electric wires 103 and other devices, the compressor may be made large-sized. Where, although a structure is also proposed wherein the whole of stator 101 is covered with an annular member for the purpose of preventing an interference between input electric wires and other devices, in such a proposal, a reduction in efficiency of assembly work and a great cost up may be caused (Patent document 1).
Patent document 1: JP-A-2003-199277

DISCLOSURE OF THE INVENTION

Problems to be Solved by the Invention

Accordingly, an object of the present invention is to provide an electric wire holding structure for an electric compressor and an electric wire holding method for an electric compressor, which can eliminate possibility of adverse affection to an input electric wire caused by vibration, etc., while preventing a reduction in efficiency of assembly work and an increase in size of the compressor.

Means for Solving the Problems

To achieve the above-described object, an electric wire holding structure for an electric compressor according to the present invention for holding an electric wire connected to an inside of an electric compressor incorporating a motor, comprises a holding member for holding an electric wire present between a connection terminal section for connection to an outside of the compressor and an electric device built in the compressor. In such a structure, because the electric wire is held not only by the connection terminal section side and the built-in electric device side but also by the holding member also at a position between the connection terminal section and the built-in electric device, the inconvenience of interference between the electric wire at this position and other devices cause by vibration, etc. can be surely prevented, and the adverse affection to the electric wire, etc. can be surely eliminated.

As the above-described built-in electric device, a stator of the incorporated motor can be exemplified. In this case, it is preferred that the electric wire is fixed at a cross section thereof across a wire pulling-out portion of the stator. The cross section may be a cross section of the electric wire and a bobbin forming the stator, and means for fixing the electric wire may be engaged with the cross section.

Further, the above-described built-in electric device is not limited to a stator of the incorporated motor, and it may be an inverter.

As the holding member in the present invention, a one-touch clip capable of being easily attached and detached can be employed. Since such a holding member can be easily attached and detached even in a narrow space for installation, a reduction in efficiency of assembly work and an increase in size of the apparatus may be prevented.

Further, in order to achieve the above-described object, an electric wire holding method for an electric compressor according to the present invention for holding an electric wire connected to an inside of an electric compressor incorporating a motor, comprises the steps of connecting an electric wire to an inside of the electric compressor incorporating a motor, and thereafter, holding the electric wire present between a connection terminal section for connection to an outside of the compressor and an electric device built in the compressor by a holding member. Namely, the method is a method for holding the electric wire by using the above-described electric wire holding structure for an electric compressor. In such a method, because the electric wire present between the connection terminal section for connection to an outside of the compressor and the electric device built in the compressor can be easily held after the electric wire of the built-in electric device and the connection terminal section for connection to the outside are connected to each other, possibility of adverse affection to the input electric wire caused by vibration, etc. can be surely eliminated, while preventing a reduction in efficiency of assembly work and an increase in size of the compressor.

Effect According to the Invention

In the electric wire holding structure for an electric compressor and the electric wire holding method for an electric compressor according to the present invention, since an electric wire present between the connection terminal section for connection to an outside of the compressor and the electric device built in the compressor can be surely held by the holding member capable of being easily attached and detached, possibility of adverse affection to the input electric wire caused by vibration, etc. can be surely eliminated, while preventing a reduction in efficiency of assembly work and an increase in size of the compressor.

EXPLANATION OF SYMBOLS

1: hybrid compressor as electric compressor
2: first compression mechanism
3: second compression mechanism
4, 18: fixed scroll
5, 19: movable scroll
6, 20: operational space
7, 21: drive shaft
8: pulley
9: electromagnetic clutch
10, 22: ball coupling
11: casing
12: suction port
13: suction path
14, 28: suction chamber
15, 29: discharge hole
16: discharge path
17: discharge port
23: electric motor
24: rotor
25: stator
26: stator housing
27: communication path
30: ball valve
31: fixed scroll member
40: connection terminal section to outside
41: external terminal for power supply
42, 64: input electric wire
43: terminal
44: projected hollow portion
45: lid
46: bobbin
47: coil portion
48, 66: holding member
49: claw
50: wire pulling-out portion
51: cross section
52: fixing portion
60: inverter device
61: outer case
62: inner case
63: inverter
65: coupler

THE BEST MODE FOR CARRYING OUT THE INVENTION

Hereinafter, an electric wire holding structure for an electric compressor and an electric wire holding method for an electric compressor according to the present invention will be explained referring to figures.

Figure 1:
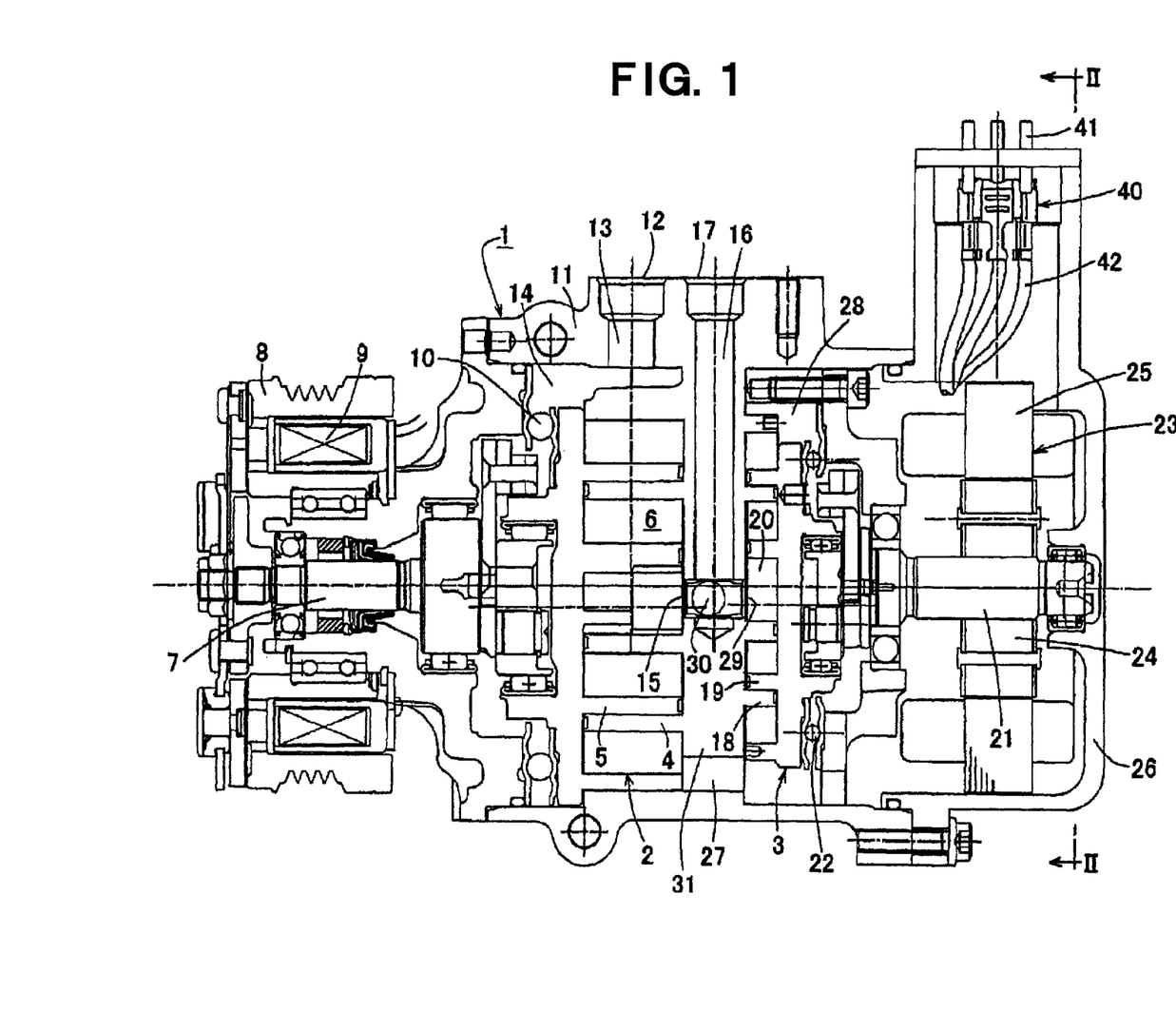
FIG. 1 is a vertical sectional view of a hybrid compressor in which an input electric wire of an incorporated motor is held using an electric wire holding structure for an electric compressor according to a first embodiment of the present invention.
Figure 2:
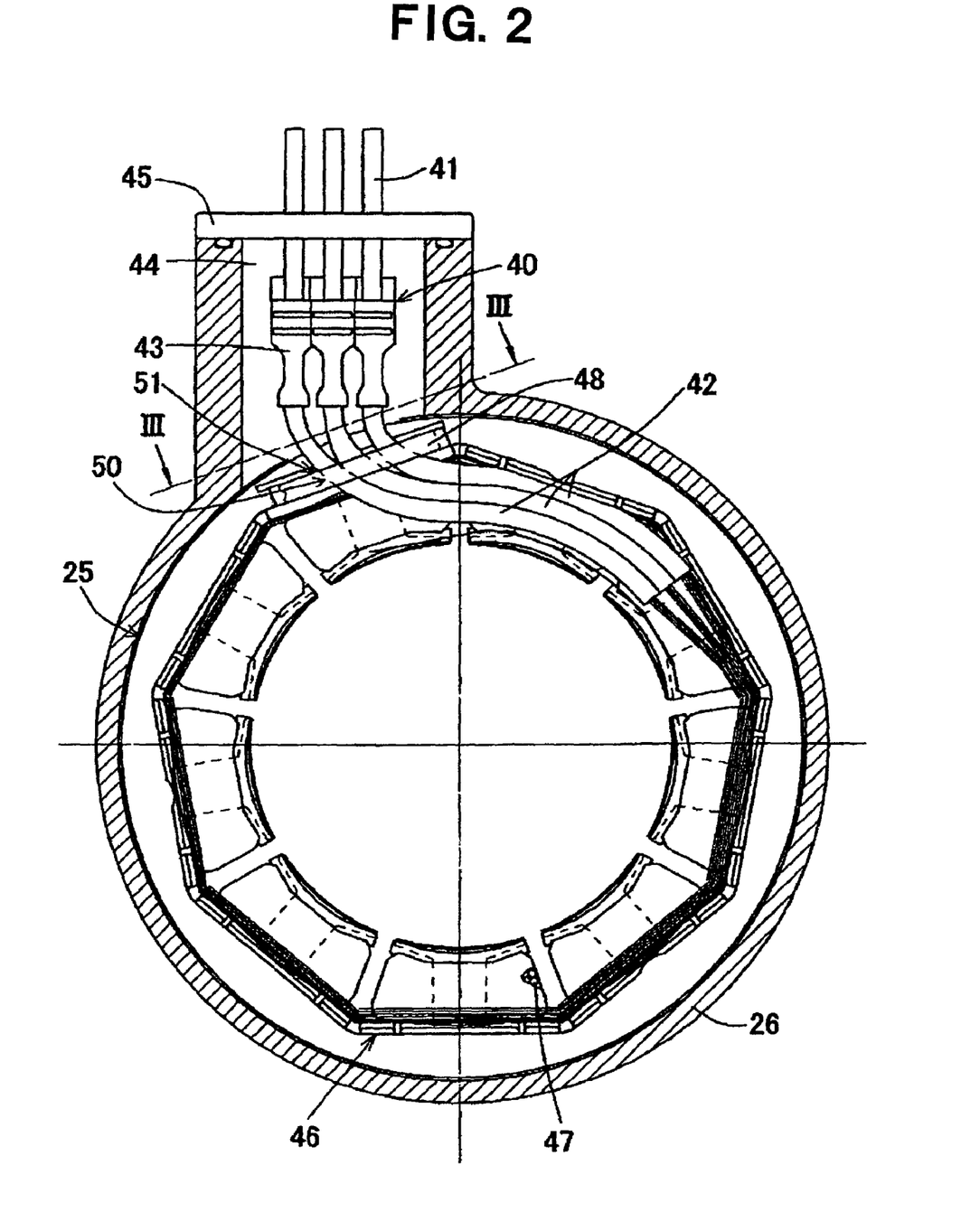
FIG. 2 is a sectional view of the hybrid compressor depicted in FIG. 1, as viewed along line II-II of FIG. 1.
Figure 3:
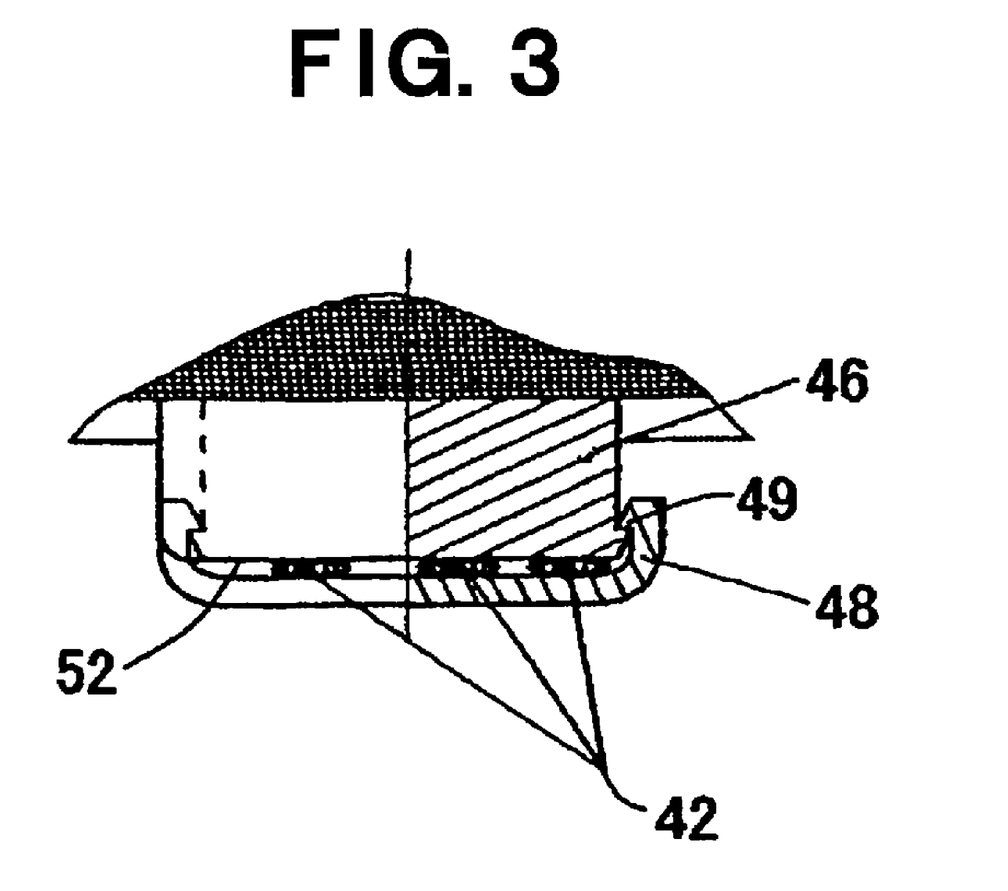
FIG. 3 is a sectional view of the hybrid compressor depicted in FIG. 2, as viewed along line III-III of FIG. 2.

FIGS. 1 to 3 depict an electric compressor in which an input electric wire of an incorporated motor is held using an electric wire holding structure for an electric compressor according to a first embodiment of the present invention. In FIG. 1, the electric compressor is constructed as a hybrid compressor 1.

First, the hybrid compressor depicted in FIG. 1 will be explained. Hybrid compressor 1 is formed as a scroll type compressor, and has a first compression mechanism 2 and a second compression mechanism 3. First compression mechanism 2 has a fixed scroll 4, a movable scroll 5 forming a plurality of pairs of operational spaces (fluid pockets) 6 by engaging with fixed scroll 4, a drive shaft 7 driving movable scroll 5 at an orbital movement by engaging with movable scroll 5, an electromagnetic clutch 9 for an on-off operation of the transmission of a driving force between a pulley 8, to which the driving force from a prime mover for running a vehicle (not shown) provided as a first drive source is transmitted, and the drive shaft 7, a ball coupling 10 for preventing the rotation of movable scroll 5, and a suction port 12 formed on a casing 11. The fluid to be compressed (for example, refrigerant gas) sucked from suction port 12 into a suction chamber 14 through a suction path 13 is taken into operational spaces 6, the operational spaces 6 are moved toward the center of fixed scroll 4 while the volumes of the operational spaces 6 are decreased, and by this operation, the refrigerant gas in the operational spaces 6 is compressed. A discharge hole 15 is formed on the central portion of fixed scroll 4, and the compressed refrigerant gas is discharged to a high-pressure side of an external refrigerant circuit through the discharge hole 15, a discharge path 16 and a discharge port 17.

On the other hand, second compression mechanism 3 has a fixed scroll 18, a movable scroll 19 forming a plurality of pairs of operational spaces (fluid pockets) 20 by engaging with fixed scroll 18, a drive shaft 21 driving movable scroll 19 at an orbital movement by engaging with movable scroll 19, and a ball coupling 22 for preventing the rotation of movable scroll 19. An electric motor 23 is incorporated in order to drive the drive shaft 21 of this second compression mechanism 3. Electric motor 23 has a rotor 24 fixed to drive shaft 21 and a stator 25, the stator 25 is fixed to a stator housing 26, and the whole of electric motor 23 is contained in the stator housing 26. In this second compression mechanism 3, the fluid to be compressed (for example, refrigerant gas) sucked from suction port 12 into suction chamber 14 of first compression mechanism 2 is sucked into a suction chamber 28 of second compression mechanism 3 through a communication path 27, the gas is taken into operational spaces 20, the operational spaces 20 are moved toward the center of fixed scroll 18 while the volumes of the operational spaces 20 are decreased, and by this operation, the refrigerant gas in the operational spaces 20 is compressed. A discharge hole 29 is formed on the central portion of fixed scroll 18, and the compressed refrigerant gas is discharged to the high-pressure side of the external refrigerant circuit through the discharge hole 29 and discharge path 16. In this embodiment, the refrigerants discharged from discharge hole 15 of first compression mechanism 2 and from discharge hole 29 of second compression mechanism 3 are both flowed out to the high-pressure side of the external refrigerant circuit through discharge path 16, and discharge holes 15 and 29 are opened and closed by movement of a ball valve 30.

In this embodiment, fixed scroll 4 of first compression mechanism 2 and fixed scroll 18 of second compression mechanism 3 are disposed back to back, and both fixed scrolls 4 and 18 are formed as an integral fixed scroll member 31.

When only first compression mechanism 2 of hybrid compressor 1 is operated, an electric power is not supplied to electric motor 23 for driving second compression mechanism 3, and the electric motor 23 is not rotated. Therefore, second compression mechanism 3 does not operate. When the hybrid compressor 1 is driven only by electric motor 23, the electric motor 23 is turned to be on and rotated, the rotation of the electric motor 23 is transmitted to drive shaft 21 of second compression mechanism 3, and the orbital movement of movable scroll 19 is performed by the drive shaft 21. At that time, electromagnetic clutch 9 of first compression mechanism 2 is not excited, and the rotation of the prime mover for running a vehicle as a first drive source is not transmitted to the first compression mechanism 2. Therefore, first compression mechanism 2 does not operate. When both first and second compression mechanisms 2 and 3 are driven simultaneously, the driving force from the prime mover for running a vehicle is transmitted to movable scroll 5 of first compression mechanism 2 as well as electric motor 23 is turned to be on and the driving force thereof is transmitted to movable scroll 19 of second compression mechanism 3.

In hybrid compressor 1 thus constructed, connection terminal section 40 of electric motor 23 for connection to the outside is disposed at an upper portion of the hybrid compressor 1 which is in a mounted condition. Connection terminal section 40 has a connection section between an external terminal for power supply 41 for electric motor 23 and a terminal 43 of an input electric wire 42 to stator 25 provided as a built-in electric device. Connection terminal section 40 is disposed in a projected hollow portion 44 which is formed on stator housing 26 and extends outward, and external terminal for power supply 41 is attached to a lid 45 which substantially can close this projected hollow portion 44.

A bobbin 46 is disposed at a position of the inner circumferential portion of stator 25, and the extended wire of input electric wire 42 to the stator side is wound onto bobbin 46 to form a coil portion 47. Input electric wire (wires) 42 present between connection terminal section 40 and stator 25 is held by a holding member 48 capable of being elastically deformed. Holding member 48 is formed as a C shape in cross section as depicted in FIG. 3, and a claw 49 is provided at each end portion. A fixing portion 52 is provided at a cross section 51 of input electric wire 42 of stator 25 across an electric wire pulling-out portion 50 from stator 25 (in this embodiment, the cross position between input electric wire 42 and bobbin 46). Holding member 48 is engaged with both end portions of fixing portion 52 by engagement of claws 49 of holding member 48, and input electric wires 42 are nipped between holding member 48 and fixing portion 52. Because holding member 48 is formed so as to be able to be elastically deformed, the holding member 48 can be easily attached and detached relative to fixing portion 52 by being elastically deformed. Namely, in this embodiment, holding member 48 is formed as a one-touch clip.

In this embodiment, because holding member 48 is provided for holding input electric wire 42 present between connection terminal section 40 for connection to the outside and stator 25, input electric wire 42 is held not only by the connection terminal section side and the stator side but also by the holding member 48 also at a position between connection terminal section 40 and stator 25, and therefore, the inconvenience of interference between input electric wire 42 at this position and other devices cause by vibration, etc. can be surely prevented, and an adverse affection to input electric wire 42 can be surely eliminated.

Further, holding member 48 formed as a one-touch clip can be easily set even if a space for installation thereof is small, and moreover, it can be easily attached after terminal 43 of input electric wire 42 is connected to external terminal for power supply 41, and therefore, a reduction in efficiency of assembly work can be prevented.

Figure 4:
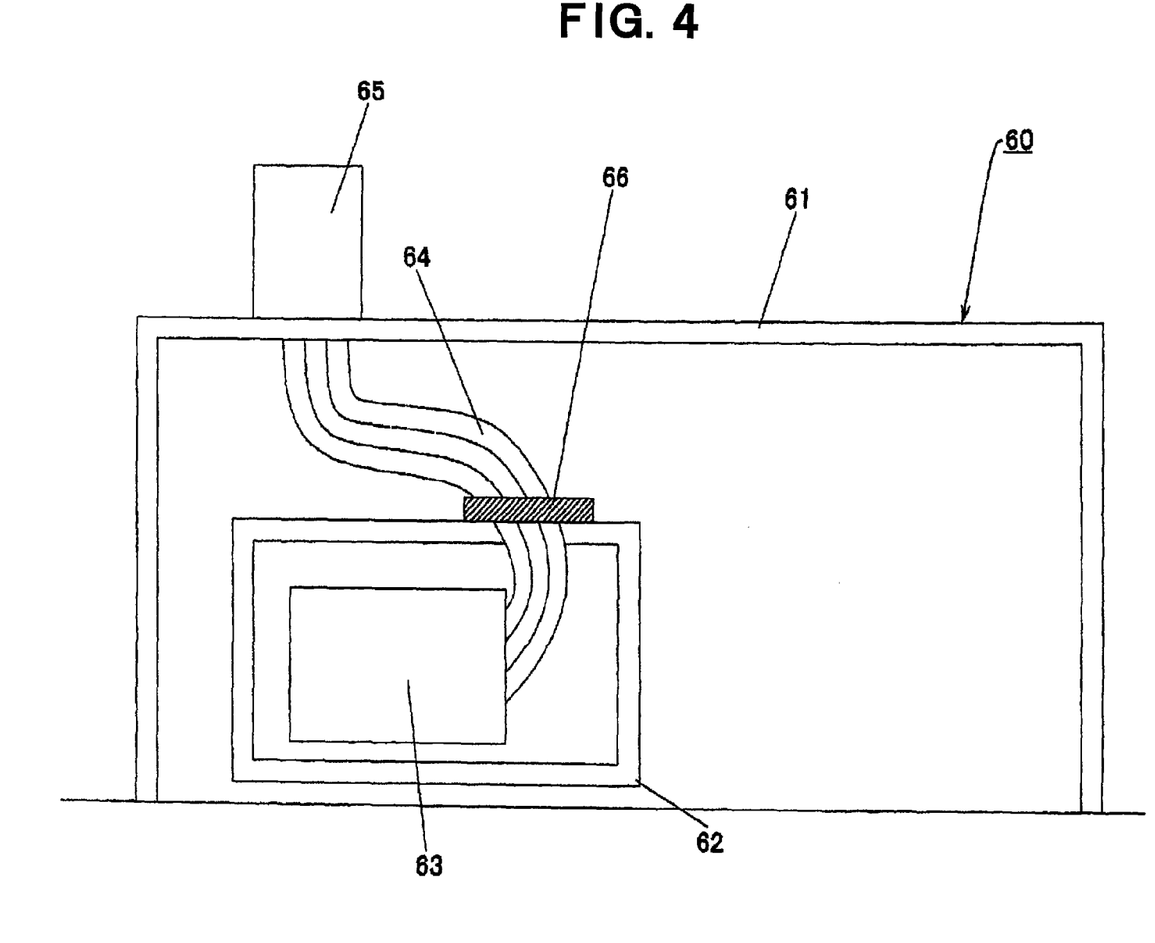
FIG. 4 is a schematic diagram of an inverter device in which an input electric wire of an inverter is held using an electric wire holding structure for an electric compressor according to a second embodiment of the present invention.

FIG. 4 depicts an electric wire holding structure for an electric compressor according to a second embodiment of the present invention, and shows a case where the electric wire holding structure for an electric compressor according to the present invention is applied to an inverter device as an built-in electric device. In FIG. 4, symbol 60 indicates the whole of the inverter device. Inverter device 60 comprises outer case 61 and inner case 62 contained in the outer case 61. Inverter 63 is stored in inner case 62, and input electric wire 64 is connected to inverter 63. A coupler 65 is provided at a tip portion of input electric wire 64 pulled out from inverter 63, and an external terminal for power supply (not shown) is connected to coupler 65. In this embodiment, coupler 65 is fixed to outer case 61.

A holding member 66 is provided between the coupler side of input electric wire 64 and inverter 63, thereby holding the input electric wire 64. Where, in FIG. 4, holding member 66 is not depicted for expressing its section, but in order to distinguish it from other members, it is expressed by applying hatching.

Also in this embodiment, because holding member 66 is provided between the coupler side of input electric wire 64 forming a connection section to the outside and inverter 63 as an electric device for holding input electric wire 64, an adverse affection to input electric wire 64 caused by vibration can be prevented.

INDUSTRIAL APPLICATIONS OF THE INVENTION

The present invention can be applied to an electric wire holding structure for an electric compressor and an electric wire holding method for an electric compressor for holding an electric wire which is connected to the inside of the electric compressor incorporating a motor, for example, which is connected to a built-in electric device such as a stator of the incorporated motor or an inverter device.

The invention claimed is:

1. A structure for holding an electric wire connected to an interior of an electric compressor incorporating a motor, comprising a holding member for holding an electric wire present between a connection terminal section for connection to an outside of said compressor and a stator in said compressor; wherein the holding member is disposed where the electric wire intersects a bobbin of the stator and the holding member engages at least one surface of the bobbin and secures the electric wire between an outer peripheral surface of the bobbin and an inner surface of the holding member.

2. The electric wire holding structure according to claim 1, wherein said holding member comprises a one-touch clip.

3. The electric wire holding structure according to claim 1, wherein the at least one surface of the bobbin are opposing surfaces of the bobbin.

4. The electric wire holding structure according to claim 3, wherein the one-touch clip comprises a pair of claws and the bobbin comprises a pair of lips formed on the opposing surfaces of the bobbin, wherein the pair of claws of the one-touch clip are configured to engage the opposing bobbin lips.

5. A structure for holding an electric wire connected to an interior of an electric device including an inverter, comprising a holding member for holding an electric wire present between a connection terminal section for connection to an outside of said electric device and an inner case housing the inverter in said electric device; wherein the holding member is disposed where the electric wire intersects the inner case and the holding member engages a surface of the inner case and secures the electric wire between the surface of the inner case and an inner surface of the inverter.

6. A method for holding an electric wire connected to an inside of an electric compressor incorporating a motor, comprising the steps of:

connecting an electric wire to an interior of said electric compressor incorporating a motor; and thereafter, holding said electric wire present between a connection terminal section for connection to an outside of said compressor and a stator in said compressor by a holding member by engaging at least one surface of the bobbin with the holding member and thereby pressing the electric wire between an outer peripheral surface of the bobbin and an inner surface of the holding member.

7. The method for holding an electric wire according to claim 6, wherein the at least one surface of the bobbin are opposing surfaces of the bobbin.

\* \* \* \* \*